United States Patent [19]

Reznik

[11] Patent Number: 4,826,698
[45] Date of Patent: May 2, 1989

[54] VACUUM CHAMBER SYSTEM

[76] Inventor: David Reznik, 2151 Barbara Dr., Palo Alto, Calif. 94303

[21] Appl. No.: 95,070

[22] Filed: Sep. 11, 1987

Related U.S. Application Data

[63] Continuation-in-part of Ser. No. 686,404, Dec. 26, 1984.

[51] Int. Cl.⁴ ............................................. A23B 9/00
[52] U.S. Cl. ................................... 426/320; 414/217
[58] Field of Search ................ 99/472, 485, 646, 477; 414/220, 217, 219, 287; 222/368; 406/65; 426/320

[56] References Cited

U.S. PATENT DOCUMENTS

| | | |
|---|---|---|
| 2,064,678 | 12/1936 | Morgan ................................. 99/472 |
| 2,538,320 | 1/1951 | Mylting . |
| 3,260,383 | 7/1966 | Fitzgerald . |
| 3,353,723 | 11/1967 | Wieleba . |
| 4,180,188 | 12/1979 | Aonuma et al. . |
| 4,252,331 | 2/1981 | Siegel . |

FOREIGN PATENT DOCUMENTS

45756/64  6/1964  Australia .
55688/69  5/1969  Australia .
50398 10/1978  Israel .

Primary Examiner—Donald E. Czaja
Assistant Examiner—Helen Pratt
Attorney, Agent, or Firm—Cushman, Darby & Cushman

[57] ABSTRACT

A pressure treatment chamber comprising an enclosure whose interior is maintained at predetermined pressure and temperature conditions, the enclosure defining at least one access port, a rotary feeder disposed within the enclosure and being maintained at the pressure and temperature conditions of the interior thereof and communicating with the access port via a conduit extending through the enclosure and filled with a condensible gas substantially to the exclusion of atmospheric air, and pressurized fluid sealing apparatus coupled to the conduit for providing communication between the conduit and the rotary feeder while reducing the amount of gas transfer between the interior and exterior of the enclosure.

23 Claims, 4 Drawing Sheets

VACUUM CHAMBER SYSTEM

REFERENCE TO CO-PENDING APPLICATION

This a continuation-in-part of U.S. patent application Ser. No. 686,404, filed Dec. 26, 1984.

FIELD OF THE INVENTION

The present invention relates to materials handling and more particularly to rotary feeders useful in vacuum and pressure applications.

BACKGROUND OF THE INVENTION

Various types of rotary feeders are known in the art for differing applications. When used in vacuum applications, for permitting ingress and egress of goods from a vacuum or pressure chamber, conventional rotary feeders comprise a circumferential seal which, in the case of a vacuum chamber is designed to minimize the leakage of air into the vacuum, and in the case of a pressure chamber is designed to minimize leakage of chamber gas out into the atmosphere.

Such seals are extremely cumbersome and expensive and involve significant frictional drag on the moving parts, and therefore require frequent and extensive maintenance. The high frictional drag on the moving parts also generates a need for more powerful vacuum pumps in the case of a vacuum chamber, and involves a considerable loss of gas in the case of a pressure chamber.

The use of a rotary feeder of the above general type in the context of a vacuum system having a sealing sleeve filled with a condensible gas is described in Israel Patent No. 50398, published Oct. 31, 1978, of the present inventor, and which corresponds to U.S. patent application Ser. No. 723,629, filed Sept. 15, 1976, now abandoned.

There is described and claimed in U.S. patent application Ser. No. 686,403, now abandoned, a rotary feeder comprising an enclosure defining an inlet and an outlet, a rotary feed member of generally cylindrical configuration arranged for rotation about its axis of symmetry within the housing and sealing apparatus arranged for sealing engagement with the rotary feed member at a location within the enclosure corresponding to either or both of the inlet and outlet, whereby frictional engagement of the rotary feed member with the sealing apparatus occurs only in the vicinity of either or both of the inlet and outlet and not throughout the enclosure or circumferentially of the rotary feed member.

In the apparatus described in the aforesaid U.S. patent application, Ser. No. 696,403, the sealing apparatus may be provided only at the outlet of the enclosure, only at the inlet of the enclosure, or at both the inlet and outlet of the enclosure.

A known application of vacuum chambers in the treatment of goods is that of the batch fumigation of nuts prior to marketing. It involves the provision of a vacuum chamber in which a batch of nuts is placed, and a high negative pressure is then applied inside the chamber for exhausting air from the space inside the nuts, between the meat of the nut and the nut shell.

Once the air has been exhausted from the nuts, the vacuum is then broken and a fumigant is introduced into the chamber which is allowed to diffuse and to be drawn into the nuts. The fumigant-laden nuts are allowed to sit for a relatively short period, of typically about three hours. A vacuum is then applied to the nuts in order to exhaust the fumigant therefrom, after which the nuts are removed from the chamber and a fresh batch of nuts is placed therein.

There are a number of disadvantages to the above described method for fumigation of nuts. One disadvantage is that a single batch of fumigant-laden nuts occupies the chamber for a period of several hours, thereby bringing the treatment plant to a standstill.

Additionally, there is a need to ensure that the nuts only occupy the chamber for the minimum allowable period of time, but ideally, they should be allowed to sit for as long as it takes for the fumigant gas to complete its fumigating action on the nuts and disintegrate. Such a length of time is normally far longer than the three hours allowed in the batch process outlined above.

An alternative nut treatment method involves exposing large batches of nuts to a fumigant gas at atmospheric pressure for a long period of time, about twenty four hours. This inevitably leads to non-uniform distribution of the gas amongst the nuts, some nuts being exposed to a smaller concentration of gas than is required, while others are exposed to a dangerously high concentration of gas. After the fumigation is completed, the chamber, or other enclosure, in which the fumigation has taken place, is aired, also for a period of about twenty four hours.

In both of the above-described fumigation processes, the vacuum chamber or other enclosure is flushed. This is not only wasteful of material, but can also lead to extensive air pollution.

SUMMARY OF THE INVENTION

The present invention seeks to provide an improved pressure system incorporating a rotary feeder, for operating at positive or negative pressures, and more particularly a vacuum treatment system incorporating a rotary feeder which is suitable, inter alia, for vacuum applications of the type described in the aforesaid Israel Patent No. 50398.

There is thus provided in accordance with an embodiment of the present invention a pressure treatment chamber comprising an enclosure whose interior is maintained at desired pressure and temperature conditions, the enclosure defining at least one access port, a rotary feeder disposed within the enclosure and being maintained at the pressure and temperature conditions of the interior thereof and communicating with the access port via a conduit extending through the enclosure and filled with a condensible gas substantially to the exclusion of atmospheric air, and pressurized fluid sealing apparatus coupled to the conduit, for providing communication between the conduit and the rotary feeder. The sealing apparatus comprises a sealing shoe defining a cylindrical sealing surface arranged for spaced mounting relative to a relatively small portion of the cylindrical periphery of the feeder, a gap being defined therebetween, and also includes apparatus for supplying a fluid under pressure to the gap, and apparatus for limiting the magnitude of the gap.

There is also provided, in accordance with an alternative embodiment of the present invention a vacuum treatment chamber comprising an enclosure whose interior is maintained at desired vacuum and temperature conditions, the enclosure defining at least one access port, a rotary feeder disposed within the enclosure and being maintained at the vacuum and temperature conditions of the interior thereof and communicating with the access port via a conduit extending through the enclosure and filled with a condensible gas substantially to the exclusion of atmospheric air, and pressurized fluid sealing apparatus coupled to the conduit, for providing communication between the conduit and the rotary feeder. The sealing apparatus comprises a sealing shoe defining a cylindrical sealing surface arranged for spaced mounting relative to a relatively small portion of the cylindrical periphery of the feeder, a gap being defined therebetween, and also includes apparatus for supplying a fluid under pressure to the gap, and apparatus for limiting the magnitude of the gap.

A further feature of the sealing apparatus is that it reduces the amount of gas transfer between the interior and exterior of the respective enclosures.

Additionally in accordance with an embodiment of the invention, the apparatus for limiting comprises spring-loaded compression members mounted on the sealing shoe such that they tend to close the gap between the cylindrical sealing surface and the relatively small portion of the cylindrical periphery, and apparatus for regulating the pressure under which fluid is supplied to the gap.

Further in accordance with an embodiment of the invention, the sealing shoe is formed of metal.

For the purposes of the present invention, a condensible gas is defined as a gas which condenses under the temperature and pressure conditions present inside the vacuum chamber. A preferred condensible gas is steam.

The apparatus of the present invention has significant advantages over prior art designs of vacuum and pressure chambers wherein the rotary feeder is disposed outside the chamber. These advantages may be summarized as follows:

a. Obviates the need for a housing surrounding the rotary feeder;

b. Enables the rotary feeder to be maintained at a uniformly low temperature, which was not possible in the prior art due to the need to avoid condensation of the condensible gas;

c. Obviates the need for vacuum or pressure sealing at the axles of the feeder;

d. Enables simpler, lighter and less expensive construction of the feeder to be used, since minimal pressure-difference related forces are exerted thereon;

e. Reduces intake of atmospheric air to the vacuum enclosure and escape of gases from the pressurized chamber;

f. Facilitates access to feeder components in the case of jamming; and g. Enables continuous cleaning of the feeder.

It is a further aim of the present invention to provide a method for the continuous gas impregnation of goods at below atmospheric pressure comprising the following steps:

providing a first vacuum chamber adapted to sustain a relatively high negative pressure for the exhaustion of air from goods, the chamber including at least one entry port and at least one exit port, for the respective ingress of goods thereinto and the egress of goods therefrom;

providing a second vacuum chamber adapted to sustain a relatively low negative pressure, for the impregnation of a gas into goods, the chamber including at least one entry port and at least one exit port, for the respective ingress of goods thereinto and the egress of goods therefrom, the chamber including apparatus for providing gas to be impregnated into goods, and also including vacuum apparatus for inhibiting the escape of gas therefrom;

providing an intermediate conduit for providing direct goods communication between the exit port of the first vacuum chamber and the enty port of the second chamber;

providing storage apparatus for impregnated goods;

providing apparatus for conveying impregnated goods from the second chamber to the storage apparatus;

continuously introducing goods into the first vacuum chamber by way of the entry port thereof and exposing goods thus introduced to a relatively high negative pressure, for exhaustion of air therefrom;

continuously discharging goods from the first vacuum chamber and continuously introducing the goods into the second chamber, by way of the intermediate conduit;

exposing goods introduced into the second vacuum chamber to a relatively low negative pressure, while releasing a gas to be impregnated into the goods into the atmosphere of the second chamber; and continuously discharging impregnated goods from the second vacuum chamber by way of the exit port thereof and thereafter conveying the goods to the storage apparatus by way of the conveying apparatus.

It will be appreciated that the method of the present invention is advantageous when compared to a method of the prior art, for, inter alia, the following reasons:

a. the method provides for continuous treatment of goods, thereby overcoming the problem of plant being uneconomically occupied for a long period of time by a single batch of goods being treated, as happens in batch impregnating of goods;

b. articles treated according to the method of the present invention may be stored for a relatively long period after being impregnated according to the present method, as while being stored they are not occupying impregnation plant;

c. as goods are continually being introduced into the vacuum chambers and discharged therefrom, it is ensured that an optimum and uniform concentration of gas reaches each of the goods;

d. gas waste and air pollution is substantially reduced when compared to the prior art by virtue of the fact that gas used for impregnation is largely confined to the vacuum chamber used for impregnation;

e. the fumigation time is shortened to a relatively short time of about one second, thereby enabling use of a significantly smaller treatment chamber when compared with a treatment chamber of the prior art; and f. the gas impregnated into the goods may include inert gases, which in some cases helps to prolong the shelf life of the goods impregnated therewith.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
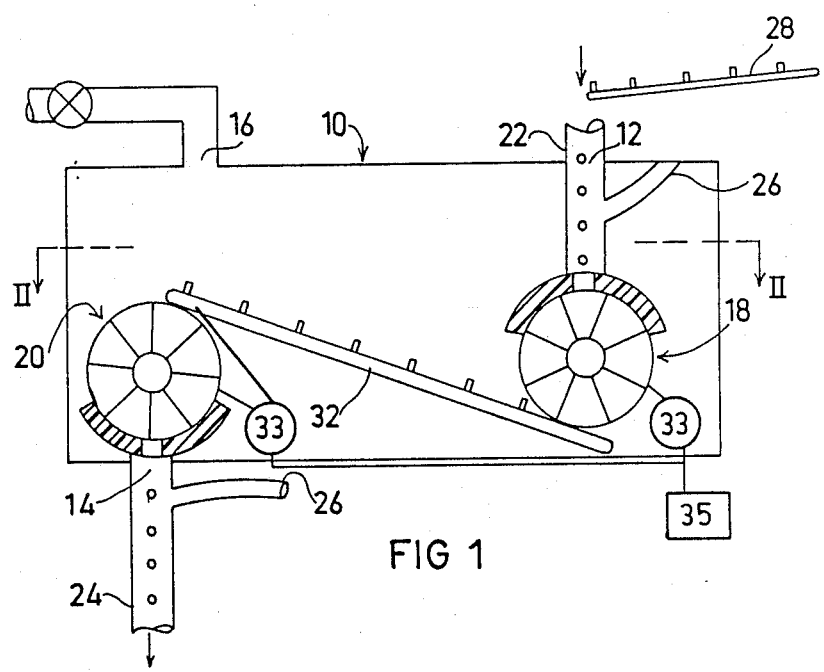
FIG. 1 is a schematic partial side sectional illustration of a vacuum treatment chamber incorporating a rotary feeder constructed and operative in accordance with a preferred embodiment of the present invention.
Figure 2:
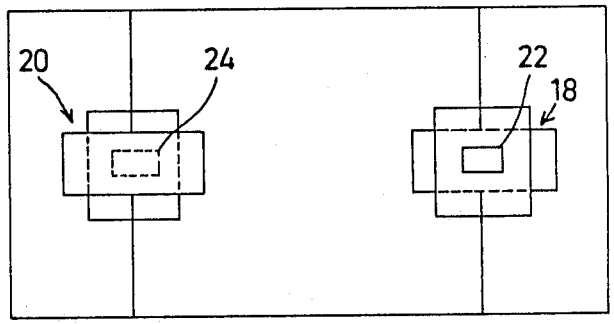
FIG. 2 is a partially cut away top view illustration of the apparatus of FIG. 1, wherein the interior conveying apparatus has been omitted for clarity.

Reference is now made to FIGS. 1 and 2 which illustrate in sectional illustration, a vacuum treatment chamber incorporating rotary feeders constructed and operative in accordance with a preferred embodiment of the present invention.

It will be appreciated by persons skilled in the art, that the present invention relates to treatment chambers that are operable at conditions of positive or negative pressure. For conciseness and clarity, however, the present invention will be described solely with respect to a treatment chamber operating under vacuum, or negative pressure, conditions.

The vacuum treatment chamber, indicated generally by reference numeral 10 is constructed in a conventional manner and is suitable for maintaining a vacuum of 28 mm Hg. The vacuum chamber may be of any suitable configuration and size and is preferably suitable for permitting manufacturing processes, such as can sealing, to be carried on therein.

Vacuum treatment chamber 10 is formed with an inlet port 12 and an outlet port 14 which permit ingress and egress of goods involved in a manufacturing process as well as a communications port 16, which communicates with a condenser. Port 16 further communicates with a vacuum pump or other source of vacuum, for maintaining the desired vacuum in the interior of chamber 10. According to an alternative embodiment of the present invention, more than two ports may be provided.

According to a preferred embodiment of the present invention at least one rotary feeder is located within the vacuum chamber and is arranged for communication with a port thereof via a conduit. In the illustrated embodiment, first and second rotary feeders 18 and 20 are located within vacuum chamber 10. Feeders 18 and 20 communicate with respective inlet and outlet ports 12 and 14 via respective feeder conduits 22 and 24. Conduits 22 and 24 communicate with the outside atmosphere. In order to minimize leakage of atmospheric air into the vacuum chamber 10, conduits 22 and 24 are filled, via supply conduits 26 with a condensible gas, such as steam, substantially to the exclusion of atmospheric air, whereby entry of the condensible gas into the vacuum chamber does not appreciably reduce the vacuum therein since the gas condenses under the temperature and pressure conditions of the inside of the vacuum chamber.

Articles or goods for treatment are supplied via conduit 22 to rotary feeder 18 by a conveyor 28, while treated articles or goods fall from rotary feeder 20 by gravity. Communication of goods within the vacuum chamber may be provided by any suitable materials handling means, which is illustrated for simplicity herein as a conveyor belt 32.

According to one preferred embodiment of the invention, the rotary feeders 18 and 20 as well as the conveyor belt 32 are powered by power sources which are located within the vacuum chamber, such as pneumatic or hydraulic motors, referenced 33, which are coupled to a source or sources of motive power, shown at reference numeral 35, such as pressurized air or hydraulic fluid, via conduits 36 which pass through the walls of the vacuum chamber 10.

Figure 4:
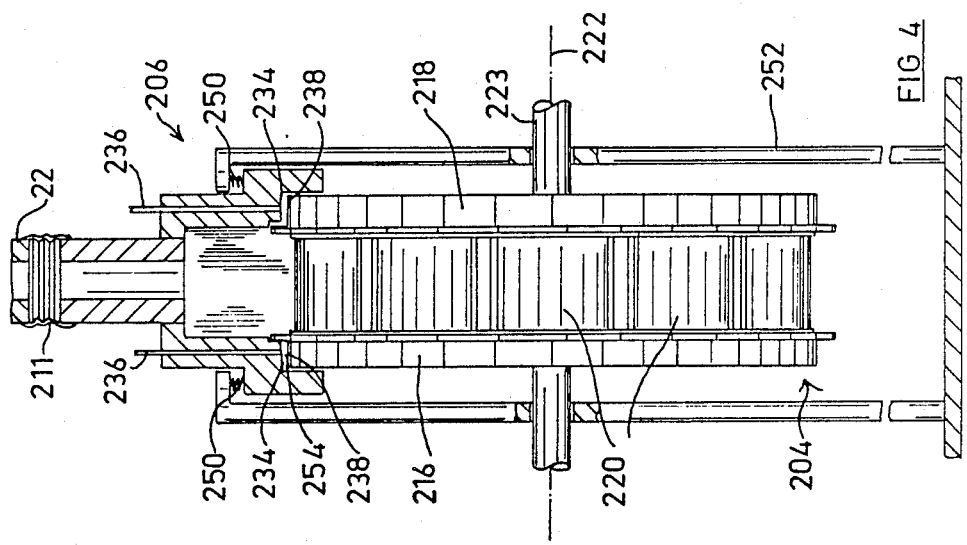
FIG. 4 is a partially cut away side illustration of the apparatus of FIG. 3 taken along the lines A—A thereof.
Figure 3:
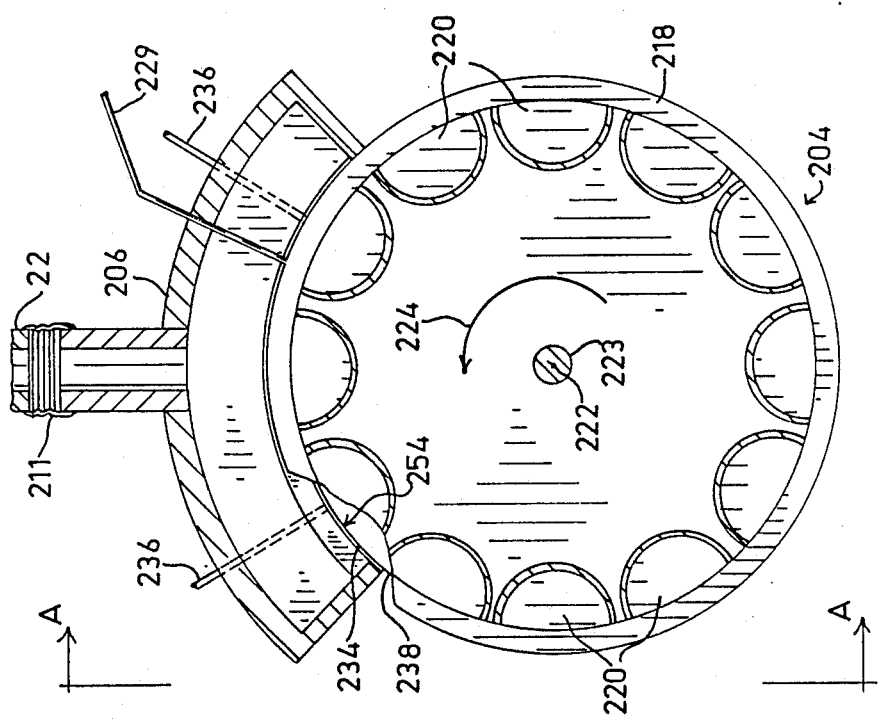
FIG. 3 is a side sectional illustration of a rotary feeder useful in a preferred embodiment of the present invention.

Referring additionally to FIGS. 3 and 4, there is shown a rotary feeder 204, constructed and operative according to a preferred embodiment of the invention.

It will be appreciated that, although feeder 204 is described below particularly in association with the ingress of goods into chamber 10 and thus is shown to correspond to rotary feeder 18, (FIG. 1), rotary feeder 204 is also suitable for use in association with the egress of goods from chamber 10, corresponding to feeder 20, (FIG.1).

Rotary feeder 204 comprises a pair of parallel circular side walls 216 and 218 between which are defined peripheral compartments 220. Feeder 204 is adapted to be rotatable about an axis of rotation 222, defined by drive shaft 223, and is arranged such that an article to be treated passing through conduit 22 enters an adjacent compartment 220.

Rotary feeder 204 is driven about axis 222, and typically in a direction as indicated by arrow 224, by a power source located within chamber 10, such as a pneumatic or hydraulic motor, referenced 33, FIG. 1. It is a particular feature of a preferred embodiment of the invention that motor 33 is located inside the chamber, thereby eliminating the need for vacuum seals associated therewith, that would be needed were motor 33 located externally of the chamber.

Hydraulic motor 33 is coupled to a source of motive power, shown at reference numeral 35, such as pressurized air or hydraulic fluid, via a conduit 36 which passes through the walls of the chamber.

In addition to conduit 26 (FIG. 1) a conduit 229 is provided, (FIG. 3) for supplying a condensible gas, typically steam, to compartments 220 of feeder 204.

Steam is supplied to a compartment 220 just before the opening of conduit 22, relative to the direction of rotation of feeder 204, as indicated by arrow 224. As described above, with FIGS. 1 and 2, steam is supplied to the compartments in order to prevent a sudden break in the vacuum which will otherwise occur due to the communication of compartment 220 with conduit 22 and also to prevent pulsation.

Shown in detail in FIGS. 3 and 4 is sealing shoe 206 which is connected to conduit 22 by way of a flexible bellow element 211. Shoe 206 defines generally arcuate sealing surfaces 234 arranged relative to peripheral surfaces 238 of feeder 204 so as to define a gap 254 therebetween.

Shoe 206 is maintained in close spaced relation with feeder 204 by means of compression members 250, typically springs, attached to a framework 252 mounted within chamber 10. Provided within shoe 206 is a fluid supply conduit 236, for supplying a fluid under pressure, typically steam or water, to gap 254.

Gap 254 is maintained by the outward force of the fluid on surfaces 234 and 238, the force being countered by compression members 250. The regulation of the fluid pressure, combined with the force applied by compression members 250, ensures that when the apparatus of the invention is in operation, gap 254 is always maintained, while being kept at a minimum.

A particular advantage accruing from the forming of a vacuum seal by means of the supply of a fluid under pressure to gap 254, is that shoe 206 may be made from metal.

The operation of the rotary feeder described hereinabove will now be reviewed briefly. As seen in FIG. 3, any articles to be subjected to vacuum treatment are loaded into compartments 220, and by rotation of feeder 204, then reach the interior of the vacuum chamber where they are transported by conventional automatic materials handling equipment.

Figure 5:
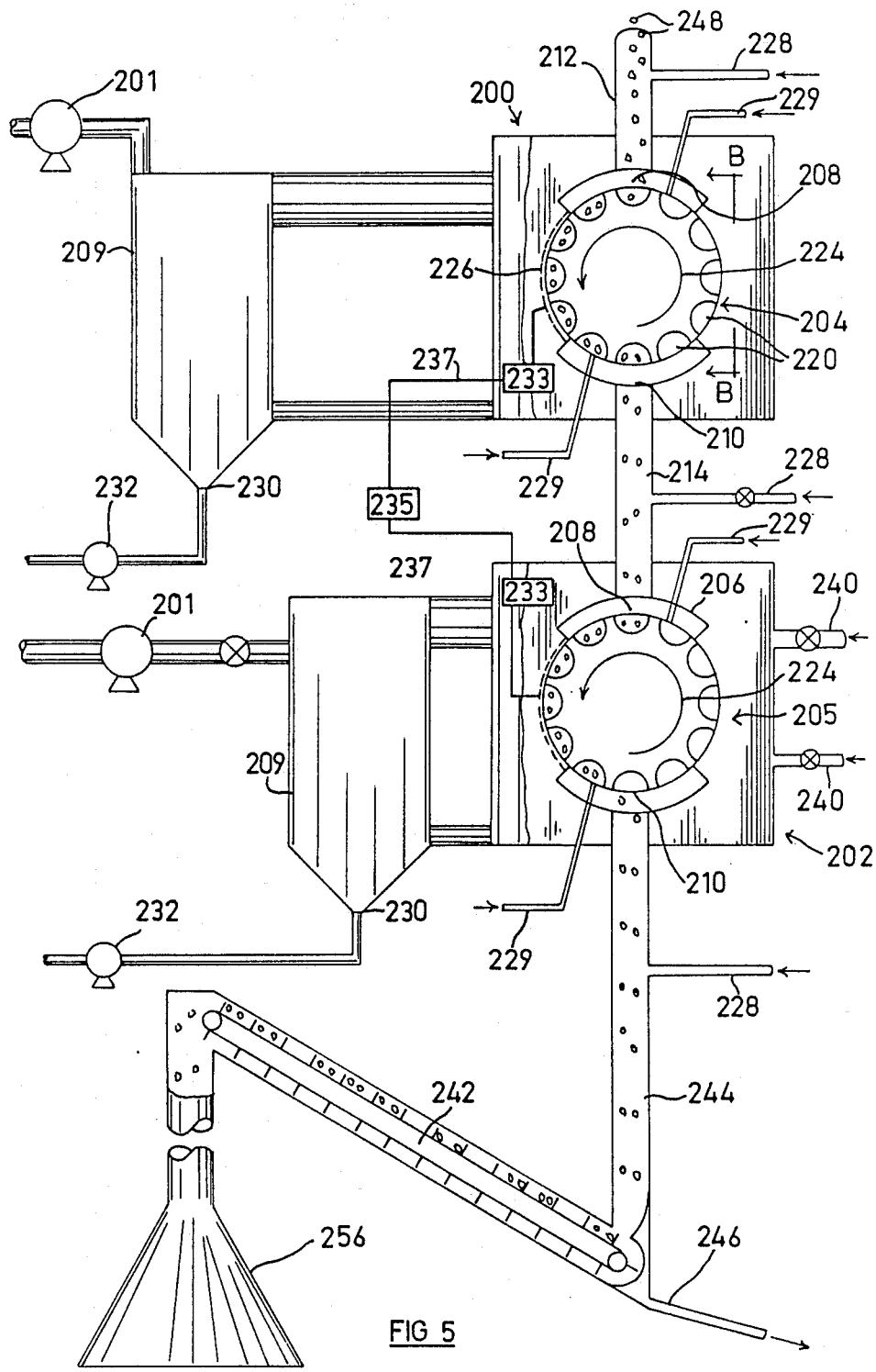
FIG. 5 shows in schematic form, a partial side sectional illustration of vacuum treatment apparatus, constructed and operative in accordance with an alternative preferred embodiment of the present invention.
Figure 6:
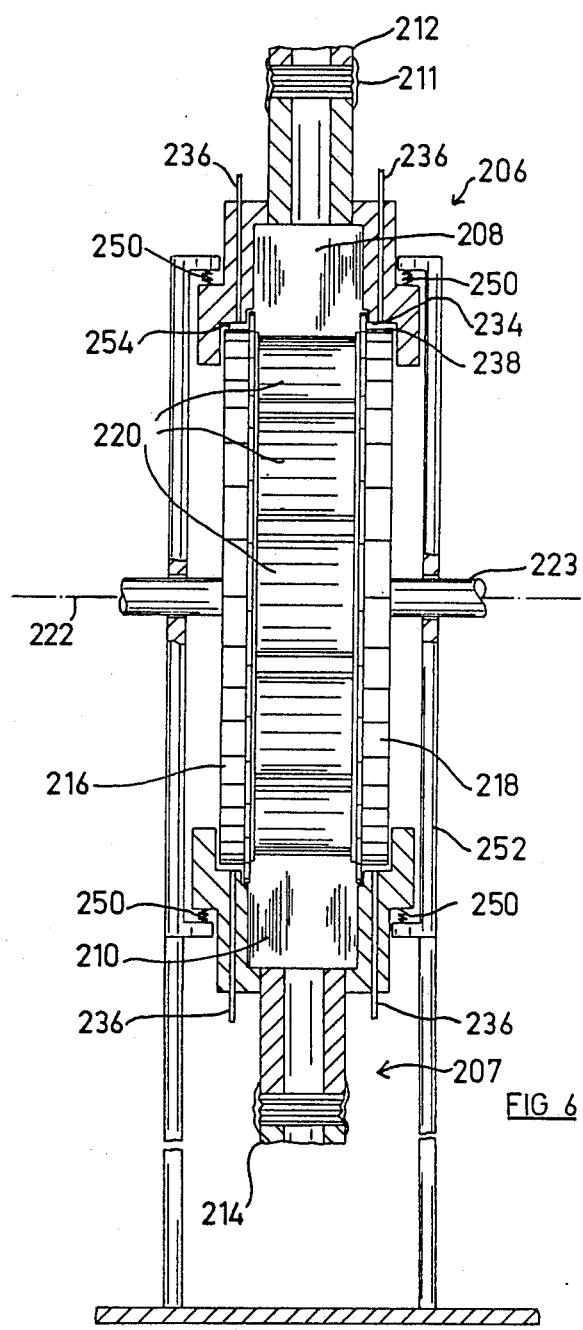
FIG. 6 is a partially cut away side view schematic illustration of a rotary feeder useful in the embodiment of the present invention shown in FIG. 5 taken along the line B—B thereof.

Now with reference to FIGS. 5 and 6, there is shown vacuum treatment apparatus constructed and operative in accordance with an alternative preferred embodiment of the present invention, and intended for use with a method of exhaustion of air from produce and the impregnation of a gas thereinto.

Although the embodiment of the invention described below relates particularly to a method for treating nuts, it will be appreciated that the described apparatus and method may be applied to any other goods that are suitable for treatment in this manner.

Similarly, although the impregnation of a fumigant gas is described below in accordance with a preferred embodiment of the invention, it will be appreciated that the described apparatus and method is also applicable to the impregnation of any suitable gas that it may be desirable to impregnate into goods.

Furthermore, it will be appreciated that the system described herein may also be used for extracting under a high negative pressure any excess fumigant remaining inside nuts or like goods, and subsequent impregnation thereof by an inert gas.

The apparatus comprises an exhaust chamber and an impregnation chamber, referenced 200 and 202 respectively, which, althoufh similar in construction have different functions, as will be described below.

The construction of chambers 200 and 202 may be conventional, and, in accordance with a preferred embodiment of the invention, both chambers include typically a single rotary feeder. The rotary feeder included in chamber 200 is referenced 204, while for clarity, the rotary feeder included in chamber 202 is referenced 205.

Feeder 204 is similar in construction and operation to the rotary feeder 204 described above with reference to FIGS. 3 and 4, except for the inclusion of an additional sealing shoe 207, which will be described below. Accordingly, where components of the embodiment of the invention shown in FIGS. 5 and 6 have previously been described in conjunction with FIGS. 3 and 4, they will not be described again except where necessary.

Exhaust chamber 200 is designed to sustain a negative pressure of up to about 680 mm Hg. The vacuum is applied and maintaned by a conventional vacuum pump 201 or by any other conventional means, and the exjposure of a nut thereto is intended to remove or exhaust the air fromthe space inside the nut between the meat and the shell, thus enabling the efficient impregnation of a gas, such as a fumigant gas, thereinto.

Rotary feeder 204 communicates with inlet and outlet ports 208 and 210 respectively, with which there are associated typically two similar, sealing shoes 206 and 207, respectively.

Inlet port 208 communicates with the atmosphere by way of a conduit 212, which is constructed and positioned such that nuts may be introduced into conduit 208, descending therethrough by gravity into rotary feeder 204, via inlet port 208.

Outlet port 210 communicates with an intermediate conduit 214, through which nuts are allowed to pass under the force of gravity, to rotary feeder 205, located in impregnation chamber 202.

After a nut has entered a compartment 220, the rotation of feeder 204 moves it to a position adjacent outlet port 210, through which it is discharged into intermediate conduit 214.

Rotary feeder 204 is driven about axis 222, and typically in a direction as indicated by arrow 224, by a power source located within exhaust chamber 200, such as a pneumatic or hydraulic motor, referenced 233.

Hydraulic motor 233 is coupled to a source of motive power, shown at reference numeral 235, such as spressurized air or hydraulic fluid, via a conduit 237 which passes through the walls of the chamber.

The speed of rotation of feeder 204 is adjustable, but typically it ensures that, between entry into chamber 200 and discharge therefrom, a nut is exposed to the vacuum therein for about one second. A screen 226 is mounted between shoes 206 and 207, to prevent nut contained in compartments 220 from falling into the chamber as feeder 204 is rotated.

Shown by reference numerals 228 and 229 are conduits for supplying a condensible gas, typically steam, to entry conduit 212 and compartments 220 of feeder 204, respectively.

Steam is supplied to entry conduit 212 thereby ensuring the exclusion of atmospheric air therefrom, helping to sustain a vacuum within chamber 200.

Steam is supplied via conduits 229 to compartments 220 at locations just before inlet and outlet ports 208 and 210 respectively, relative to the direction of rotation of feeder 204, as indicated by arrow 224. As described above in conjunction with FIGS. 1 and 2, steam is supplied to the compartments in order to prevent a sudden break in the vacuum which will otherwise occur due to the communication of compartments 220 with conduit 212 and also to prevent pulsation.

Due to the vacuum applied in chamber 200, and a condenser 209 mounted in association therewith, the steam, or other condensible gas, condenses at a relatively low temperature, and is removed from the chamber at a drainage point 230, where there may also be pumping apparatus 232 of any conventional type.

As noted above, impregnation chamber 202 is similar to exhaust chamber 200, and, with the exception of rotary feeder 205, similar components are designated by similar reference numerals. Also, for the purpose of consiseness, components used in conjunction with impregnation chamber 202 that have already been described above with relation to exhaust chamber 200 are not described again.

Impregnation chamber 202 is positioned relative to exhaust chamber 200 such that nuts discharged from outlet port 210 of feeder 204 in exhaust chamber 200 pass under gravity through intermediate conduit 214 and into inlet port 208 of feeder 205. Although conduit 214 is shown to be vertically oriented, this is only for exemplary purposes and in an alternative embodiment of the invention it need not necessarily be oriented as shown.

Chamber 202 is designed to sustain a slight negative pressure of up to about 50 mm Hg, which is applied and maintained by of vacuum means 201. It is a particular feature of the invention that the slight negative pressure sustained within chamber 202 prevents the escape of any dangerous substances, such as fumigant gases, from the chamber, steam supplied to conduit 214 instead being sucked into the chamber therefrom more particularly, the condensable gas such as steam is supplied to the intermediate conduit 214 at a pressure higher than the negative pressure in either chamber 200 or 202. Thus, the steam in conduit 214 will tend to be sucked into chamber 202 rather than allowing the escape of any fumigant gases from chamber 202 and/or flow from chamber 202 to chamber 200.

There are provided gas conduits 240, for the purpose of supplying a fumigant gas into chamber 202, which although is typically methyl bromide, may be any other desired gas or combination of gases.

Outlet port 210 of shoe 207 communicates with a conveyor 242 by means of an outlet conduit 244 to which a condensible gas, typically steam, is supplied by means of gas supply conduit 228, which assist in the maintenance of the vacuum inside chamber 202.

A drainage conduit is provided, as indicated by reference numeral 246, for draining any liquid present in conduit 244 as a result of the condensation of the condensible gas supplied thereto.

Drainage conduit 246 also leads to a vent (not shown), through which is discharged any fumigant gas that may be released from impregnated nuts 248 inside conduit 244 as they pass therethorugh.

With reference to FIGS. 5 and 6, a method of exhaustion of air from nuts and the gas impregnation thereof will now be described.

Nuts to undergo impregnation, shown by reference numeral 248, are introduced into entry conduit 212 of exhaust chamber 200 and are allowed to fall under ggravity into the steam environment of a compartment 220 of rotary feeder 204, mounted within exhaust chamber 200.

As feeder 204 is rotatedn in the direction shown by arrow 224, nuts 248 are exposed to a vacuum of about 680 mm Hg for about one second, in order to exhaust the air from the gap between the meat and the shell of the nut. Nuts 248 are then discharged from chamber 200 and enter rotary feeder 205 in chamber 202, by way of intermediate conduit 214.

Although it has been found that for walnuts, a one second exposure to a vacuum of about 680 mm Hg is sufficient in order to exhaust the air therefrom, where a different exposure time is required this may be achieved by adjusting the speed of rotation of feeder 204 accordingly.

Nuts 248 that are discharged from chamber 200 into the steam enviroment of intermediate conduit 214 and into a compartment 220 of feeder 205 in chamber 202 initially suck in some steam. This is due to a strong negative pressure prevailing in the newly emptied space inside the nut.

Although the nuts are subsequently exposed to a vacuum in chamber 202, as mentioned above, the vacuum is only about 50 mm Hg, which is very slight compared to the much stronger vacuum of about 680 mm Hg to which the nuts were exposed in chamber 200. The steam present inside the nuts condenses, and fumingat gas, of which the atmosphere in chamber 202 is composed, is subsequently drawn thereinto.

The gas may include a mixture of air, nitrogen, carbon monoxide, and a fumigant, which, as noted above, may be methyl bromide.

Of particular importance in the method described above, is the equal distribution of fumigant that occurs among all the nuts treated. In a system of impregnation under normal atmospheric conditions the fumigant gas is imparted to the nuts by diffusion with the result that not all the nuts receive equal amounts of gas. In the system of the present invention, however, as an equal negative pressure is applied to each nut, each nut tends to suck in fumigant gas at an equal pressure while in the second chamber.

The resulting equivalent distribution allows for far more accurate regulation of the maximum amount of fumigant that may reach any given nut, and it also ensures that danerously high amounts of gas can not be unintentionally be supplied to the nuts, while also ensuring that enough gas is supplied for fumigation purposes.

Upon being discharged into the steam environment of exit conduit 244, in which the prevailing pressure is approximately atmospheric, the nuts will suck in some steam, due to a residual negative pressure, and once they have cooled, they will then suck in some air. The nuts are then conveyed away by a conveyor 242 to a silo 254, for a period of time that allows the organic operaton of the fumigant and its subsequent decomposition within the nuts.

It will be appreciated by persons skilled in the art that the present invention is not limited by the respective configurations of the chambers or the rotary feeders or the described uses and applications thereof, as shown and described hereinabove. Rather, the scope of the invention is defined only by the claims which follow:

I claim:

1. A pressure treatment chamber comprising:
an enclosure whose interior is maintained at predetermined pressure and temperature conditions, said enclosure defining at least one access port;
a rotary feeder disposed within said enclosure and being maintained at the pressure and temperature conditions of the interior thereof and communicating with said access port via a conduit and filled with a condensible gas substantially to the exclusion of atmospheric air, said rotary feeder comprising a rotor defining an overall cylindrical periphery and sides and a drive shaft onto which said rotor is mounted, and a source of motive power for driving said drive shaft in rotational motion located within said enclosure; and
pressurized fluid sealing means coupled to said conduit, for providing communication between said conduit and said rotary feeder along a communication path, while preventing outflow of gases from the interior of said enclosure along said path, said sealing means comprising:
a sealing shoe defining a cylindrical sealing surface arranged for spaced mounting relative to a relatively small portion of said cylindrical periphery of said feeder such that a gap being defined therebetween;
means for supplying a fluid under pressure to the gap; and
means for limiting the magnitude of the gap.

2. Apparatus according to claim 1, and wherein said means for limiting comprises:
spring-loaded compression members mounted on said sealing shoe such that they end to close the gap between said cylindrical sealing surface and said relatively small portion of said cylindrical periphery; and means for regulating the pressure under which fluid is supplied to the gap.

3. Apparatus according to claim 2, and wherein said fluid is a condensible gas.

4. Apparatus according to claim 2, and wherein said fluid is water.

5. Apparatus according to claim 2 and wherein said rotary feeder comprises a cylindrical rotor defining a plurality of peripheral compartments.

6. Apparatus according to claim 5, and wherein said sealing shoe is formed of metal.

7. Apparatus according to claim 5, and also including means for supplying a gas into said enclosure for treatment of articles introduced thereinto.

8. A vacuum treatment chamber comprising:
an enclosure whose interior is maintained at predetermined vacuum and temperture conditions, said enclosure defining at least one access port;
a rotary feeder disposed within said enclosure and being maintained at the vacuum and temperture conditions of the interior thereof and communicating with said access port via a conduit and filled with a condensible gas substantially to the exclusion of atmospheric air, said rotary feeder comprising a rotor defining an overal cylindrical periphery and sided and a drive shaft onto which said rotor is mounted, and a source of motive power for driving said drive shaft in rotational motion, located within said enclosure; and
pressurized fluid sealing means coupled to said conduit, for providing communication between said conduit and said rotary feeder along a communication path, while preventing inflow of atmospheric air into the interior said enclosure along said path, said sealing means comprising a sealing shoe defining a cylindrical sealing surface arranged for spaced mounting relatice to a relatively small portion of said cylindrical periphery of said feeder, a gap being defined therebetween, and alos including means for supplying a fluid under pressure to the gap, and including means for limiting the magnitude of the gap.

9. Apparatus according to claim 8, and wherein said means for limiting comprises:
spring-loaded compression members mounted on said sealing shoe such that they tend to close the gap between said cylindrical sealing surface and said relatively small portion of said cylindrical periphery; and
means for regulating the pressure under which fluid is supplied to the gap.

10. Apparatus according to claim 9, and wherein said fluid is a condensible gas.

11. Apparatus according to claim 9, and wherein said fluid is water.

12. Apparatus according to claim 9 and wherein said rotary feeder comprises a cylindrical rotor defining a plurality of peripheral compartmenst, there being defined a peripheral travel path when said rotor is rotated.

13. Apparatus according to claim 12, and wherein said peripheral travel path defined at least one pair of first and second locations, said pressurized fluid sealing means being provided at said second location, and said first location being adapted to be reached by a given compartment before said second location is reached thereby upon rotation of said rotor, there being provided gas supply conduits at said first locations for filling said peripheral compartments with a condensible gas, thereby preventing pulsation when a given compartment reaches said second location wherein goods are introduced into. or discharged from, said enclosure.

14. Apparatus according to claim 10, and wherein said sealing shoe is formed of metal.

15. Apparatus according to claim 14, and also including means for supplying a gas into said enclosure for treatment of articles introduced thereinto.

16. A method for the continuous gas impregnation of goods at below atmospheric pressure comprising the following steps:
providing a first vacuum chamber adapted to sustain a relatively high negative pressure for the exhaustion of air from goods, said chamber including at least one entry port connected to the atmosphere by a conduit filled with a condensible gas and at least one exit port, for the respective ingress of goods thereinto and the egress of goods therefrom;
providing a second vacuum chamber adapted to sustain a relatively low negative pressure, for the impregnation of gas of generally uniform density into goods, said chamber including at least one entry port and at least one exit port connected to the atmosphere by a conduit filled with a condensible gas, for the respective ingress of goods thereinto and the egress of goods therefrom, said chamber including means for providing gas to be impregnated into goods, and also including vacuum means for forming an initial vacuum for preventing atmospheric pollution, by inhibiting the escape of gas therefrom;
providing an intermediate conduit for providing direct goods communication between said exit port of said first vacuum chamber and said entry port of said second chamber, said intermediate conduit being filled with a condensible gas at a higher pressure than the pressure in the chambers so as to prevent gas flow from said low vacuum chamber to said first high vacuum chamber;
providing storage means for impregnated goods;
providing means for conveying impregnated goods from said second chamber to said storage means;
continuously introducing goods into said first vacuum chamber by way of said entry port thereof and exposing goods thus introduced to a relatively high negative pressure, for exhaustion of air therefrom;
continuously discharging goods from said first vacuum chamber and continuously introducing the goods into said second chamber, by way of said intermediate conduit;
exposing goods introduced into said second vacuum chamber to a relatively low negative pressure, while releasing a gas to be impreganted into the goods into the atmosphere of said second chamber; and
continuously discharging impregnated goods from said second vacuum chamber by way of said exit port thereof and thereafter conveying the goods to said storage means by way of said conveying means.

17. A method according to claim 16, and wherein both said first vacuum treatment chamber and said second vacuum treatment chamber comprise:
an enclosure whose interior is maintained at predetermined vacuum and temperature conditions, said enclosure defining at least two access ports;
a rotary feeder disposed within said enclosure and being maintained at the vacuum and temperature conditions of the interior thereof and communicating whith said access ports via a corresponding number of conduits and filled with a condensible gas substantially to the exclusion of atmospheric air, said rotary feeder comprising a rotor defining an overall cylindrical periphery and sided and a drive shaft onto which said rotor is mounted, and a source of motive power for driving said drive shaft in rotational motion located within said enclosure; and a plurality of pressurized fluid sealing means, a single means being coupled to each of said conduits, for providing communication between said conduits and said rotary feeder while preventing direct entry of atmospheric air into the interior of said enclosure, said sealing means comprising a sealing shoe defining a cylindrical sealing surface arranged for spaced mounting relative to a relatively small portion of said cylindrical periphery of said feeder, a gap being defined therebetween, and also including means for supplying a fluid under pressure to the gap, and including means for limiting the magnitude of the gap.

18. A method according to claim 17, and wherein said means for limiting comprises:

spring-loaded compression members mounted on said sealing shoe such that they tend to close the gap between said cylindrical sealing surface and said relatively small portion of said cylindrical periphery; and means for regulating the pressure under which fluid is supplied to the gap.

19. A method according to claim 18, and wherein said fluid is a condensible gas.

20. A method according to claim 18, and whereis said fluid is water.

21. A method according to claim 18, and wherein said rotary feeder comprises a cylindrical rotor defining a plurality of peripheral compartments adapted to receive goods introduced into said first and second enclosures, confine said goods therein, and permit gravitational exit thereof from said enclosures.

22. A method according to claim 18, and including the following additional steps:

rotating said rotary feeder in a trvel direction such said peripheral compartments travel along a peripheral travel path, there being defined along said path a plurality of pairs of first and second locations, one of said pressurized fluid sealing means being provided at each of said second locations, said first location being reached by a given compartment before said second location;

providing gas supply conduits at said first locations, for filling said peripheral compartments with a condensible gas, such that upon reaching said second location wherein goods are introduced or discharged from said enclosure, pulsation is prevented; and preventing pulsation by supplying a condensible gas at said first locations.

23. A method according to claim 17, and wherein said sealing shoe is formed of metal.

* * * * *